(12) United States Patent
Lindner et al.

(10) Patent No.: US 9,139,736 B2
(45) Date of Patent: *Sep. 22, 2015

(54) SURFACE-MODIFIED SILICIC ACID SEMI-GELS

(75) Inventors: Gottlieb Lindner, Bonn (DE); Hans-Dieter Christian, Ueberlingen (DE)

(73) Assignee: Evonik Degussa GmbH, Essen (DE)

( * ) Notice: Subject to any disclaimer, the term of this patent is extended or adjusted under 35 U.S.C. 154(b) by 226 days.

This patent is subject to a terminal disclaimer.

(21) Appl. No.: 13/392,890

(22) PCT Filed: Aug. 20, 2010

(86) PCT No.: PCT/EP2010/062175
§ 371 (c)(1),
(2), (4) Date: Feb. 28, 2012

(87) PCT Pub. No.: WO2011/038992
PCT Pub. Date: Apr. 7, 2011

(65) Prior Publication Data
US 2012/0156470 A1   Jun. 21, 2012

(30) Foreign Application Priority Data

Sep. 29, 2009  (DE) .......................... 10 2009 045 109

(51) Int. Cl.
*C09C 1/30* (2006.01)
*C09D 7/12* (2006.01)
*C09D 7/00* (2006.01)

(52) U.S. Cl.
CPC .............. *C09C 1/3081* (2013.01); *C09D 7/005* (2013.01); *C09D 7/1291* (2013.01); *C01P 2006/12* (2013.01); *C01P 2006/14* (2013.01); *C01P 2006/16* (2013.01); *C01P 2006/17* (2013.01); *Y10T 428/249979* (2015.04); *Y10T 428/249991* (2015.04)

(58) Field of Classification Search
USPC .................. 428/304.4, 403; 523/212, 216
See application file for complete search history.

(56) References Cited

U.S. PATENT DOCUMENTS

| 4,285,846 | A | 8/1981 | Hardy et al. | |
|---|---|---|---|---|
| 5,094,839 | A | 3/1992 | Lowder et al. | |
| 2005/0282934 | A1 | 12/2005 | Brinkmann et al. | |
| 2005/0282935 | A1* | 12/2005 | Christian et al. | 523/212 |
| 2012/0202914 | A1* | 8/2012 | Benner et al. | 522/99 |
| 2013/0079433 | A1* | 3/2013 | Lindner et al. | 522/99 |

FOREIGN PATENT DOCUMENTS

| DE | 10 2004 012 090 | 12/2004 |
|---|---|---|
| EP | 1 607 448 | 12/2005 |
| JP | 50 070468 | 6/1975 |

OTHER PUBLICATIONS

International Search Report Issued Dec. 13, 2010 in PCT/EP10/62175 Filed Aug. 20, 2010.

* cited by examiner

*Primary Examiner* — Hai Vo
(74) *Attorney, Agent, or Firm* — Oblon, McClelland, Maier & Neustadt, L.L.P.

(57) ABSTRACT

The invention relates to novel surface modified semi-gels, to a method for producing same, and to the use thereof.

14 Claims, No Drawings

SURFACE-MODIFIED SILICIC ACID SEMI-GELS

CROSS-REFERENCE TO RELATED APPLICATIONS

This application is a National Stage of PCT/EP2010/062175 filed on Aug. 20, 2010. This application is based upon and claims the benefit of priority to German Application No. 10 2009 045 109.9 filed on Sep. 29, 2009.

BACKGROUND OF THE INVENTION

The present invention relates to new surface-modified semi-gels, to a process for preparing them, and to their use.

Inorganic oxides based on $SiO_2$ are divided, on the basis of their preparation process and their properties, into fumed silicas (Aerosils), precipitated silicas, silica sols, silica gels, and semi-gels.

Among silica gels, a distinction is made between hydrogels, aerogels and xerogels. Hydrogels—or else aquagels—are prepared in water, and so their pores are filled with water. A xerogel is a hydrogel from which the water has been removed. An aerogel is a xerogel from which the liquid has been removed in such a way that there is only minimal change to the structure of the gel and the pore volume is largely retained.

Silica gels have been known for a long time (Iler, "Chemistry of Silica", p. 462 ff, 1979). They are prepared under conditions which promote coalescence of primary particles (average particle size: 1 to 10 nm), so that in contrast to precipitated or fumed silicas a relatively rigid, three-dimensional network is formed. Consequently silica gel particles differ distinctly from precipitated silica particles.

The preparation of silica gels is well known to the skilled person; see, for example, U.S. Pat. No. 4,097,303, DE 41 32 230, and EP 0 384 226. It involves mixing sodium silicate and sulphuric acid with one another rapidly and continuously at low temperatures, low pH, and high concentrations, to form a hydrosol, which in turn, after a short time, is condensed to the hydrogel. Alternatively the gelling can also take place under alkaline conditions (see, for example, GB 1,219,877, GB 1,279,250, WO9825 851 or EP 0 588 497). A further alternative is proposed in EP 0 765 764.

The resultant hydrogel is broken into relatively small pieces and washed to remove soluble salts and impurities. During the washing cycle the pore structure of the hydrogel is adjusted by varying pH (e.g., adding bases such as ammonia, for example), temperature, and time. The procedure is well known to the skilled person. Examples can be found in EP 0 384 226 or WO00002814, for instance.

Following the washing cycle the washed hydrogel is dried by thermal means in order to form a silica gel or xerogel. The nature and mode of drying have a substantial influence on the pore volume of the silica gel. With rapid drying the pore volume can be very largely maintained; in the case of slow drying, the pore volume reduces. Finally the silica gel can be ground or comminuted to a specific particle size and particle distribution.

Fumed silicas differ from silica gels in that fumed silicas are constructed from aggregates of primary particles, whereas silica gels feature a three-dimensional network of primary particles. These structural differences are caused by the preparation process. Detailed information on the structure of fumed silicas is found in Kirk-Othmer's Encyclopedia of Chemistry, page 776.

Precipitated silicas have a different structure again, characterized not only by aggregates but also, in particular, by agglomerates. They are obtained by the so-called wet process, in which waterglass and acids are reacted so as to form aggregates and agglomerates, and not, as in the case of gels or gel-like products, three-dimensional networks of primary particles. The structural differences between precipitated silicas and fumed silicas are described in Kirk-Othmer's Encyclopedia of Chemistry.

A fourth variant of the amorphous silicon dioxides is represented by the semi-gels. In comparison to silica gels, semi-gels have a broader pore size distribution, a lower mechanical stability, and a different fractal dimension (3-D networks). In comparison to precipitated silicas, on the other hand, they have a narrower pore size distribution, and so in terms of the pore size distribution, semi-gels can be placed between silica gels and precipitated silicas.

In terms of the preparation process as well there are differences. Thus silica gels are prepared, as described above, with a constant concentration of dissolved colloidal silica. Waterglass and acid are mixed so that there are no longer any changes in concentration. After optional ageing, this produces silica gels in more or less large blocks.

Semi-gels, in contrast, are prepared with constant stirring or introduction of shearing energy, the $SiO_2$ concentration being increased during the reaction, with the result that, at the end, particulate structures, rather than a "block", are obtained. Semi-gels are sold, for example, by the Beijing Aerospace Sai De Power Material Technical Company Ltd., Yuquan Road No. 16, Haidian District, Beijing (China).

Both precipitated silicas and silica gels are used as matting agents in coatings. U.S. Pat. No. 4,285,846 also discloses the use of semi-gels as matting agents.

Besides the advantage of reducing the gloss of coatings, however, the use of matting agents in coatings also leads to problems. For instance, in certain coating systems, the addition of the matting agent undesirably increases their viscosity. As described in EP 0 442 325, particularly thixotropic, conventional solventborne alkyd coatings are difficult to matt in light of their rheological properties. This relates in particular to aqueous coating systems on acrylate or acrylate-polyurethane, or corresponding hybrid systems.

A further problem frequently observed with matting agents is that they have a propensity towards sedimentation. In order to prevent matting agents sedimenting in coatings, the surface of the majority of commercially customary matting agents is coated with a surface modifier. Here, organic components are attached to the $SiO_2$ surface. This attachment may be chemical, so that true chemical bonds form between $SiO_2$ surface and organic component, and may also be physical, i.e., the organic component is adsorbed onto the $SiO_2$ surface by means of Van der Waals interactions or hydrogen bonds. Surface modification, however, carries problems in its wake. Thus commercially customary, surface-modified matting agents often have the disadvantage that during storage of the coating material the coating may become detached and hence the desired effect is at least partly annulled again. This can lead to impairments of the coating properties.

The document WO200342293 discloses a matting agent where a silica gel has been coated with wax. WO9951692 proposes coating the silica gel with a urea-urethane derivative.

Coating a silica gel with a polyol in accordance with patent EP 0 442 325 produces a matting agent which has very little effect, if any, on the thixotropic behaviour of inks and coating materials based on polyamide-modified alkyd resins.

DE 102004029069, in turn, discloses the surface modification of silica gels with organopolysiloxanes, and DE 102004012090 discloses the surface modification of precipitated silicas with organopolysiloxanes.

As far as semi-gels are concerned, only waxing as a surface modification has been disclosed to date. Corresponding products are sold by Beijing Aerospace Sai De Power Material Technical Company Ltd., Yuquan Road No. 16, Haidian District, Beijing (China).

For different applications there are a large number of different coating materials and different coating-material compositions. In order to allow even greater flexibility and improvement in the performance properties of the coatings, there is a continuous need for new, alternative matting agents.

It was an object of the present invention, therefore, to provide new, surface-modified semi-gels which can be used as matting agents in coatings. A specific object was to provide surface-modified semi-gels which have better performance properties than the wax-modified semi-gels known in the prior art.

A further object was to provide a process with which the surface-modified semi-gels of the invention can be prepared.

Further objects, not explicitly mentioned, arise from the overall context of the subsequent description and examples.

Surprisingly it has been found that these objects are achieved by means of the surface-modified semi-gels of the invention, defined in more detail in the following description and also in the claims and the examples, and by means of the process described in more detail in the description, the examples, and the claims.

The present invention provides surface-modified semi-gels characterized in that at least parts of the surface of the semi-gel have been modified with at least one organopoly-siloxane and/or at least one modified organopolysiloxane.

The invention further provides semi-gels characterized in that at least parts of the surface of the semi-gel have been modified with at least one organopolysiloxane and/or at least one modified organopolysiloxane, and in that they have
  a BET surface area of 200 to 400 m$^2$/g, preferably of 210 to 350 m$^2$/g,
  a mesopore volume for pores having a diameter of 2-30 nm of 0.95 to 1.5 ml/g, preferably of 1.0 to 1.4 ml/g,
  a mesopore volume for pores having a diameter of 2-50 nm of 1.2 to 1.8 ml/g, preferably of 1.3 to 1.7 ml/g,
  a pore maximum in the range from 10 to 50 nm from 15 to 45 nm.

Likewise provided by the present invention are processes with which the surface-modified semi-gels of the invention can be prepared, characterized in that the surface of a semi-gel is contacted with at least one organopolysiloxane and/or at least one modified organopolysiloxane.

The invention provides, lastly, for the use of the surface-modified semi-gels of the invention, especially as matting agents in paints and coatings.

The advantages of the surface-modified semi-gels of the invention over commercial, SiO$_2$-based matting agents include the following:

matting agents based on semi-gels have advantages over precipitated-silica-based matting agents in the sector of coil coating, since they are more transparent.

Semi-gels coated with polysiloxanes have the advantage over wax-coated silicon dioxides that the surface modifier is attached by true chemical binding and not by physical effects. Hence there is a lower risk of detachment of the surface modifier. Furthermore, very thin siloxane layers on the semi-gel can be realised, leading to economic advantages.

Semi-gels of the invention with carbon-carbon multiple bonds in the polysiloxane have particular advantages in the context of use in UV coating materials such as UV varnishes, for example. These systems can be matted significantly more effectively with the products of the invention than with commercial matting agents based on silicon dioxide. Without being tied to any particular theory, the inventors are of the view that the multiple bond is also crosslinked in the course of curing, and hence ensures a particularly good attachment.

The present invention is described in detail below. To start with, however, a number of important terms are defined.

Silica gels for the purposes of the present invention are inorganic oxides based on SiO$_2$ which are prepared via a gel process. Silica gels subdivide into the groups of the hydrogels, the aerogels, and the xerogels. Hydrogels—or else aquagels—are prepared in water and so their pores are filled with water. A xerogel is a hydrogel from which the water has been removed. An aerogel is a xerogel from which the liquid has been removed in such a way that there is only minimal change to the structure of the gel and the pore volume is largely retained.

Semi-gels are amorphous silicon dioxides which in comparison to silica gels have a broader pore size distribution and in comparison to precipitated silicas have a narrower pore size distribution, and so in terms of the pore size distribution, semi-gels can be placed between silica gels and precipitated silicas.

By surface modification is meant the chemical and/or physical attachment of organopolysiloxanes and/or modified organopoly-siloxanes. In other words, in surface-modified semi-gels, at least part of the surface of at least some of the semi-gel particles is coated with the surface modifier.

The terms organopolysiloxane and polyorganosiloxane, and modified organopolysiloxane and modified polyorganosiloxane, are each used synonymously.

The surface-modified semi-gels of the invention are characterized in that at least parts of the surface of the semi-gel have been modified with at least one organopolysiloxane and/or at least one modified organopolysiloxane.

The surface-modified semi-gels of the invention preferably, moreover, have the following physicochemical parameters:

The BET surface area influences the surface activity of the semi-gel and hence the stabilization of the network within the coating system, and this in turn affects the rheological properties of said system, especially the viscosity. The BET surface area is therefore preferably in the range from 200 to 400 m$^2$/g, preferably from 200 to 350 m$^2$/g, more preferably from 200 to 300 m$^2$/g.

The pore structure of the semi-gels of the invention substantially influences their interactions with the coating system. If the pores are too small or the pore volume is too low, then the coating material is unable to penetrate the polymer components sufficiently, and there are therefore hardly any interactions. If, on the other hand, the pores are too large, the interactions are again too weak, since the polymers can easily be dissolved out of the pores again. The semi-gels of the invention therefore preferably have the following pore characteristics:
  a mesopore volume for pores having a diameter of 2-30 nm of 0.7 to 1.5 ml/g, preferably 0.95 to 1.4 ml/g, preferably of 1.0 to 1.3 ml/g,
  a mesopore volume for pores having a diameter of 2-50 nm of 0.9 to 1.8 ml/g, preferably of 1.0 to 1.7 ml/g, more preferably 1.1 to 1.6 ml/g, and a pore maximum in the range from 10 to 50 nm, preferably from 15 to 45 nm, preferably from 15 to 40 nm, and very preferably from 20 to 35 nm.

In specific embodiments, the semi-gels of the invention preferably have at least one of the following properties:

It has been found that the DBP oil absorption of the semi-gels of the invention can be correlated to a certain extent with the matting efficiency. Moreover, the DBP is important for ensuring optimum uptake of organopolysiloxane. The DBP oil absorption of the semi-gels of the invention is therefore preferably in the range of 150-500 g/100 g, more preferably 200-450 g/100 g and especially preferably 250-400 g/100 g.

In order to be able to obtain a particularly good matting effect, but at the same time allowing a smooth coating surface, the average particle size $d_{50}$ of the surface-modified silicon dioxides of the invention is situated preferably in the range of 1-50 µm, more preferably 1-40 µm, very preferably 1-30 µm, especially preferably 2-20 µm, and very especially preferably 3-15 µm. The average particle size may be varied according to the film thickness of the coating.

The sedimentation behaviour of the surface-modified semi-gels of the invention is generally 1 to 2.

All stated ranges of preference may be set independently of one another.

The particular properties of the semi-gels of the invention can be attributed, as well as to their specific physicochemical properties in particular to the polymers used for the surface modification. Semi-gels which exhibit the properties according to the invention preferably have a surface which has been treated with one or more polyorganosiloxanes or modified polyorganosiloxanes. With particular preference the semi-gels involved are semi-gels which have been treated with polyether-, acrylate- and/or polyacrylate-modified polyorganosiloxanes or polyalkoxysiloxanes.

In one particularly preferred embodiment of the present invention the semi-gels have a surface coated with polyorgano-siloxanes of the following general structure:

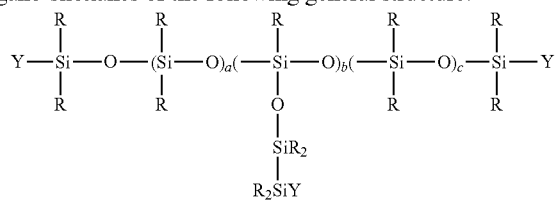

where
Y=—OH, —OR or
Y=$H_5C_2$—O—$(C_2H_4O)_m$—, $H_7C_3$—O—$(C_3H_6O)_m$— or

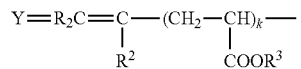

R=-alkyl especially methyl or ethyl,
$R^2$=alkyl or H,
$R^3$=alkyl,
$R^4$=H or alkyl,
a=0-100, b=0-100, c=0-100, d=0-100,
sum a+b+c+d is or preferably is not equal to 0,
m=0-100 and k=0-100.

In a further preferred embodiment of the present invention the surface of the semi-gels is coated with a polyorganosiloxane of the following general structure:

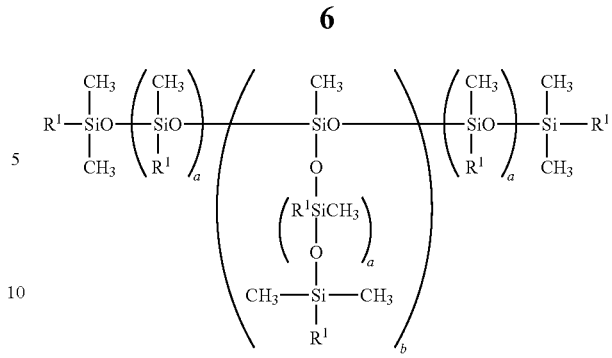

where
$R_1$=a methyl radical or

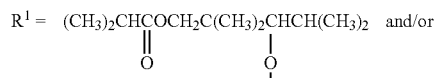

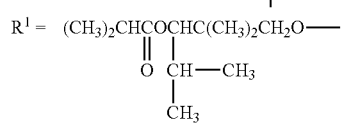

and the sum of the units a=0 to 100, the sum of the units b=0 to 15, the ratio of methyl to alkoxy radicals $R^1$ being less than 50:1, and b>1 if a=0 and a>5 if b=0. Further details, relating in particular to the preparation of these polyorganosiloxanes, can be found in DE 36 27 782 A1. The content of that patent application is likewise subject matter of the present specification.

The term "alkyl radical" embraces straight-chain and branched-chain alkyl radicals having 1 to 100 C atoms, preferably 1 to 25, more preferably 1 to 10 C atoms, and also cycloalkyl radicals having 1 to 15 C atoms. The alkyl radicals may contain one or more double or triple bonds, and individual atoms may be replaced by heteroatoms such as O, N or S.

In another preferred embodiment of the present invention, silicone polyether acrylate polymers or silicone polyether methacrylate polymers are used. Particular preference is given to using acrylic esters and/or methacrylic esters of hydroxy-functional siloxanes and/or polyalkylene-modified siloxanes. Particular preference is given to using organopolysiloxanes which are obtained by esterification or transesterification of acrylic acid and/or methacrylic acid or acrylic esters and/or methacrylic esters, in the presence of an enzyme which catalyses the esterification or transesterification, with hydroxy-functional and/or polyoxyalkylene-modified siloxane derivatives of the general formula (I)

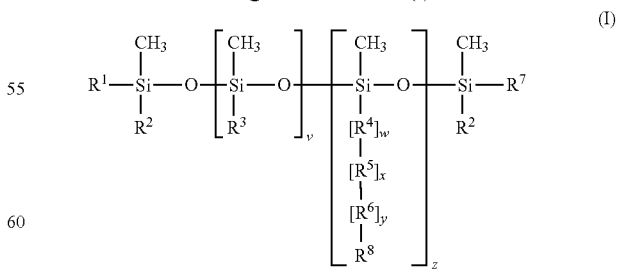

where
$R^1$ and/or $R^7$=$R^2$ or $[R^4]_w$—$[R^5]_x$—$[R^6]_y$—$R^8$,
$R^2$=$R^3$ or ≠$R^3$ stands for identical or different alkyl radicals or alkylene radicals having 1 to 24 carbon atoms or optionally substituted phenyl radicals having up to 24 carbon atoms, $R^4$=a divalent radical of the formula O, NH, $NR^2$, S or a radical of the formula $(OSi(CH_3)_2)_u$, where
u=1 to 200, $R^5$=identical or different alkyl radicals or alkylene radicals having 1 to 24 carbon atoms, or $C_nH_{2n-f}R^2_f$—$R^4$—$C_mH_{2m-g}R^2_g$, where
f=0 to 12,
g=0 to 12,
n=1 to 18,
m=1 to 18, $R^6$=O—$(C_2H_{4-a}R^2_aO)_b$ $(C_cH_{2c}O)_d$, where
a=0 to 3,
b=0 to 100,
c=2 to 12,
d=0 to 100,
the sum of (b+d)=1 to 200,
and the sequence of the individual polyoxyalkylene segments $(C_2H_{4-a}R^2_aO)_b$ and $(C_cH_{2c}O)_d$ may be arbitrary and encompasses especially block copolymers, such as random polymers and also combinations thereof, or $R^6$=$O_e$—$C_hH_{2h}$—$C_iH_{2i-j}R^9_j$, where
e=0 or 1,
h=0 to 24,
i=0 to 24,
j=1 to 3, the sum of (w+e)=0 to 1
and $R^9$ in each case is a divalent radical of the formula O, a hydroxyl group, a radical of the formula $C_hH_{2h}$ or a radical of the formula $C_kH_{2k-l}(OH)_l$, where
k=0 to 24 and
l=1 to 3, $R^8$=a hydrogen radical or a monovalent organic radical, when y is 1, it being necessary for there to be at least one hydrogen radical present per molecule, or an OH group or a monovalent organic radical, when y=0, there being at least one OH group present per molecule,
v=0 to 200,
w=0 or 1,
x=0 or 1,
y=0 or 1,
z=0 to 200
and the sum of (w+x+y)=1 to 3
and, when z=0, $R^1$ and/or $R^7$ are
$[R^4]_w$—$[R^5]_x$—$[R^6]_y$—$R^8$
and, when x=0, then w=0 as well.

It is a familiar concept to the skilled person that the compounds are present in the form of a mixture with a distribution governed essentially by laws of statistics. In particular, the values for the indices b, d, u, v and z therefore represent average values.

Examples of siloxane derivatives which can be reacted in accordance with the invention by enzymatically catalysed esterification or transesterification of acrylic and/or methacrylic acid or acrylic and/or methacrylic esters are as follows:

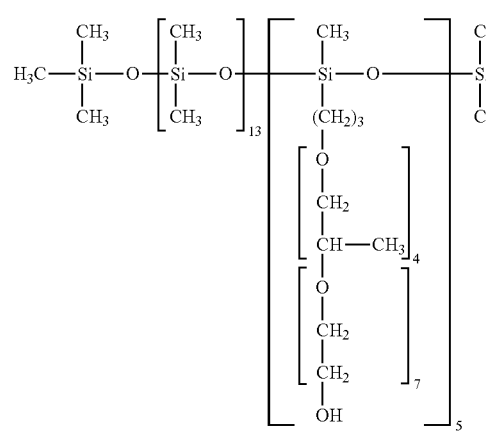

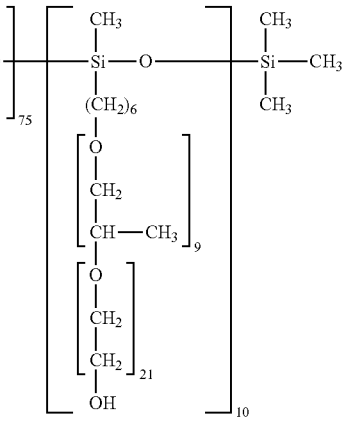

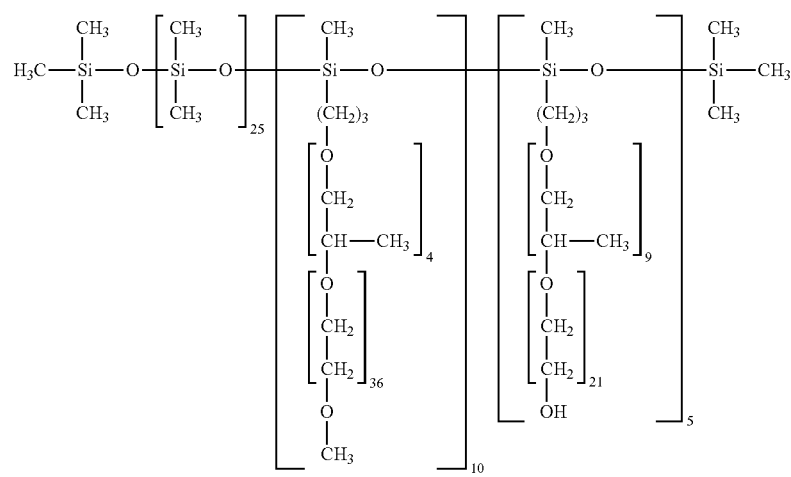

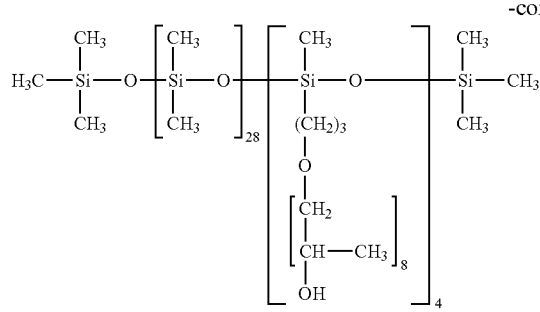
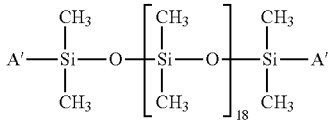
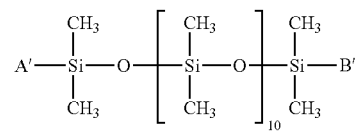
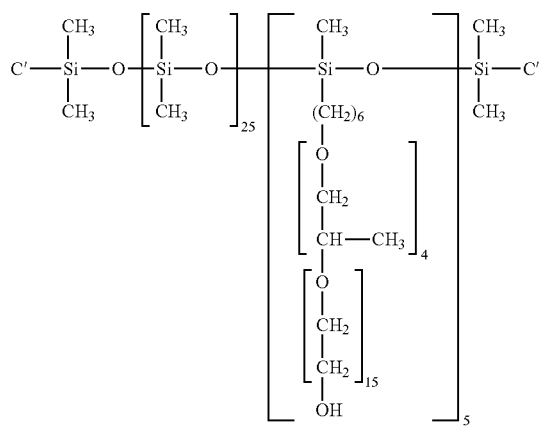
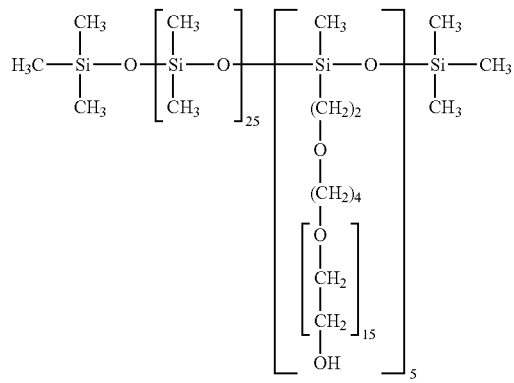
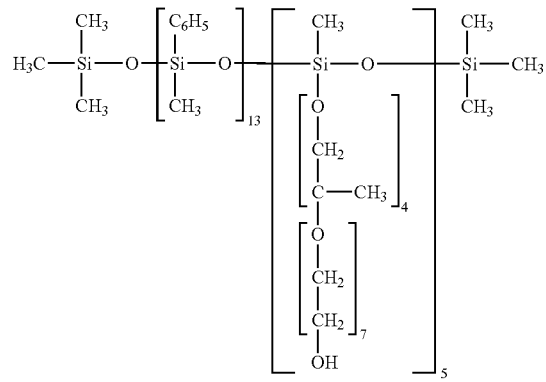
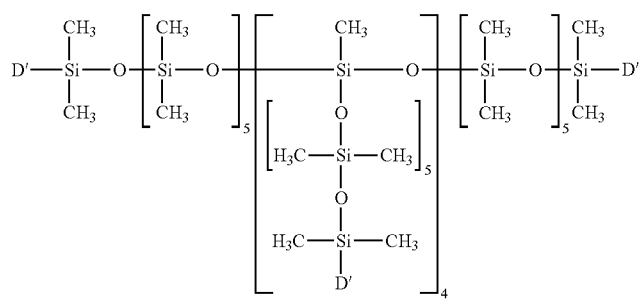
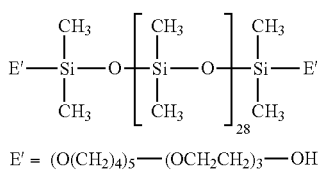

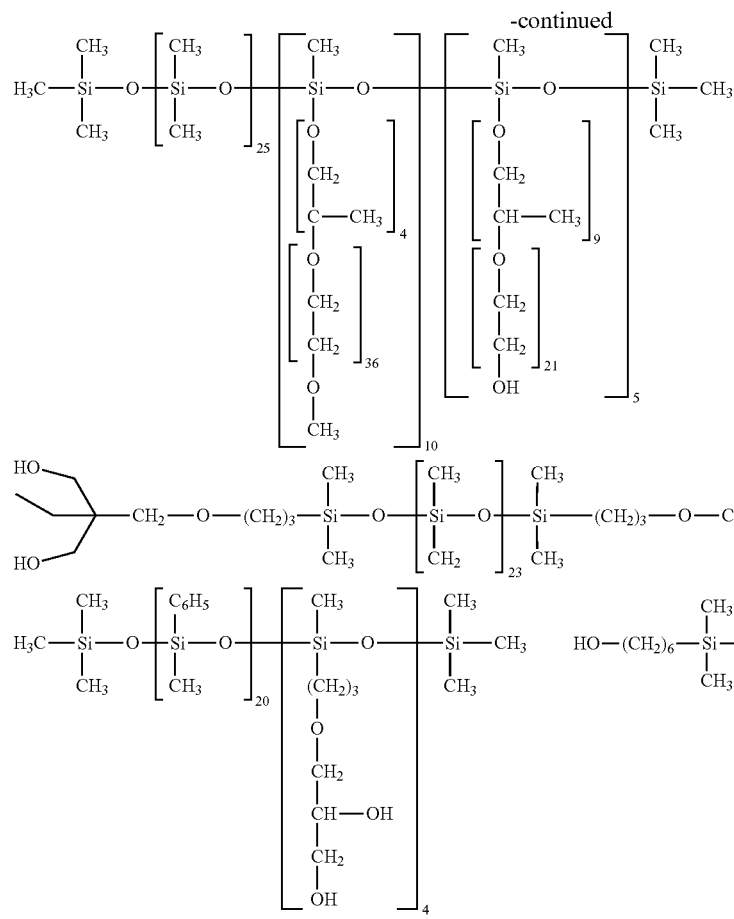
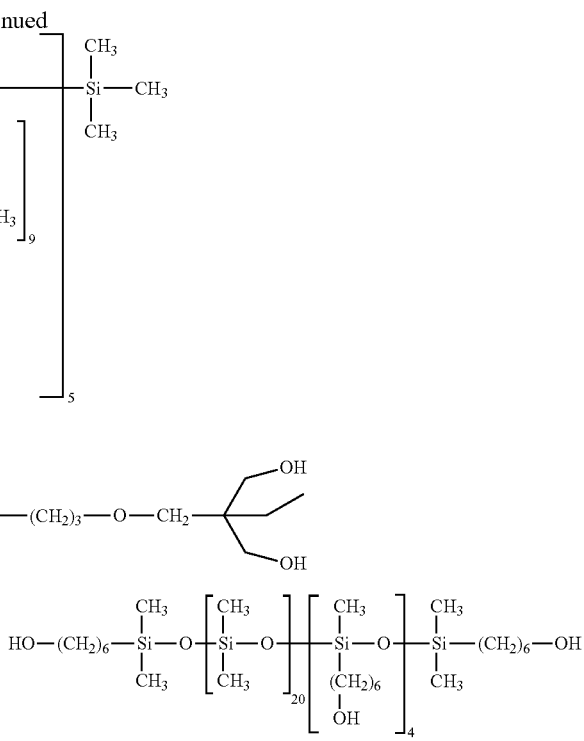

The enzymatic esterification or transesterification of acrylic and/or methacrylic acid or acrylic and/or methacrylic esters with the compounds stated above at low temperatures, more particularly 20 to 100° C., preferably 40 to 70° C., under mild conditions is advantageous on account of the paler colour of the product, the avoidance of the formation of by-products, which may otherwise originate, for example, from chemical catalysts, the uncomplicated removal of the enzyme catalyst from the product, and the avoidance of unwanted and uncontrolled free-radical polymerization of the acryloyl and/or methacryloyl compounds.

The acryloyl- and/or methacryloyl-functional siloxane derivatives obtainable in this way are notable for the fact that 5% to 100% of all of the hydroxyl groups originally present have undergone conversion to acrylic and/or methacrylic ester.

The acrylicization and/or methacrylicization take place ideally in high yields with esters of acrylic and/or methacrylic acid as donor molecules, more particularly methyl, ethyl or butyl methacrylate and/or acrylate.

Enzymes which can be employed preferably as catalysts are hydrolases, especially esterases, lipases and proteases. A specific example thereof is Novozym® 435. The enzymes can be used in pure form or in a form in which they are immobilised on a support, on which they are bound chemically or physically. The amount of the enzyme catalyst, based on the modified siloxane employed, is in particular 0.1% to 20% by weight, preferably 1% to 10% by weight. The reaction time is dependent on the amount used and on the activity of the enzyme catalyst, and is for example up to 48 hours, preferably up to 24 hours.

In order to arrive at high degrees of conversion rapidly and under simple reaction conditions, it is advantageous to use an excess of at least 10% by weight of acrylic acid and/or methacrylic acid and/or their corresponding esters (as donors) in the reaction mixture.

The production system can be characterized either by a stirred tank reactor or a fixed bed reactor. The stirred tank reactor may be equipped with apparatus for distilling off the alcohol liberated from the acrylic and/or methacrylic acid donor, or the water liberated from the acrylic and/or methacrylic acid.

The reaction is preferably continued until the desired conversion is achieved. A reaction regime with simultaneous distillation is preferred, since the removal of the water of reaction or alkanol of reaction leads to higher yields in shorter reaction times, owing to the shifting of the reaction equilibrium.

In order to maximize degrees of conversion it is advisable to remove the water or alkanol of reaction.

After the end of the reaction, the enzyme catalyst can be removed by suitable measures, such as filtration or decanting, and if desired can be used a number of times.

The fixed bed reactor is packed with immobilized enzymes, the reaction mixture being pumped through the catalyst-packed column. With an enzyme immobilized on a support it is also possible to carry out the reaction in a fluidized bed.

The reaction mixture can be pumped continuously through the column, the residence time and hence the desired conversion being controllable via the flow rate. It is also possible to pump the reaction mixture through the column in circulation, in which case the water or alkanol of reaction may be distilled off at the same time under reduced pressure.

Other methods of removing the water or alkanol of reaction can also be used, such as absorption or pervaporation.

These silicone polyether acrylate- or silicone polyether methacrylate-polysiloxane-modified semi-gels are particularly suitable for use in UV-curing coating systems, since the double bond in the polymers is also able to crosslink in the course of curing.

The surface-modified semi-gels of the invention can be prepared by various processes, in each of which the surface of the semi-gel is contacted with at least one organopolysiloxane and/or at least one modified organopolysiloxane.

In one embodiment I of the present invention, the organopolysiloxane and an optionally pre-ground semi-gel are intensely mixed. The addition is made such as to ensure a homogeneous distribution over the semi-gel. Thereafter the mixture is preferably dried, ground and, if desired, sieved or classified.

In one embodiment II of the present invention, dried semi-gel having a residual moisture content of ≤10% is mixed intensely with the organopolysiloxane. The addition of the organopoly-siloxane is made such as to ensure a homogeneous distribution of the semi-gel. Thereafter the mixture is optionally ground and, if desired, sieved or classified.

In one embodiment III of the present invention, semi-gel is ground and at the same time the surface is modified. For this purpose the polymer is conveyed into the milling chamber of the mill in such a way as to bring about the desired coating ratio. Thereafter the product is optionally sieved or classified and, if desired, dried.

In the case of process variants I and II it is preferred to introduce a semi-gel into a mixer, to add the surface modifier and to carry out intense mixing with the semi-gel. With regard to the mixer there are no particular restrictions. Lödige mixers or tumble mixers, for example, can be used.

The addition is made preferably such as to ensure a homogeneous distribution over the semi-gel. This is possible, for example, through spray introduction or nozzle introduction or dropwise addition, or other methods known to the skilled person.

It possible to use dry semi-gel and also moist semi-gel, i.e., a filter cake. The moisture content of the semi-gel may be from 1% to 15% by weight.

In process variants I and II, the semi-gel is preferably subjected to pre-grinding prior to coating. Where a dry semi-gel is used, it is preferably dried by accelerated drying. Drying assemblies which have been found particularly suitable include spray dryers, grinding dryers, pneumatic dryers or spin-flash dryers. The moisture content of the dry semi-gels is preferably 1% to 15%, more preferably 2% to 10%, very preferably 3% to 5%, by weight.

In process variant 3, the surface modification takes place in a milling apparatus, and the semi-gel is preferably simultaneously ground, surface-modified, and, very preferably, also dried at the same time. In this variant as well it is possible to use a pre-ground semi-gel, but preferably no preliminary grinding takes place.

For the preliminary grinding in the process variants described above, all kinds of mills are suitable, but mechanical beater mills are preferred.

For fine grinding to give the end product, which is necessary for the product to be finely divided as needed for application as a matting agent, air and steam jet mills have proved to be particularly suitable. With particular preference the fine grinding is carried out on an opposed-jet fluidized-bed mill.

In order to avoid oversize or bits it is advantageous to remove particles having a diameter of more than 50 μm, preferably more than 30 μm, in particular more than 20 μm. Depending on the fineness of the matting agent, this can be done by means, for example, of an appropriate sieve or a classifier device, which may also be integrated into the mill.

The surface modification may take place, as described above, before, during or after grinding or drying. The surface modifier may be added in pure, undiluted form or in dilute form as an aqueous emulsion. It is preferred to add 0.2% to 12%, more preferably 1% to 10%, very preferably 2% to 8%, and especially preferably 3% to 8%, by weight, of the organopoly-siloxane, relative to the semi-gel.

The unmodified semi-gel precursors used in the process of the invention may be prepared by known processes or acquired commercially. Particular preference is given to using the semi-gels SD 500, SD 520, SD 530, SD 538, SD 540, SD 600, SD 640 and SD 690 from Beijing Aerospace Sai De Power Material Technical Company Ltd., Yuquan Road No. 16, Haidian District, Beijing (China) (China).

As starting material it is preferred to use a semi-gel, more preferably a semi-gel which is not surface-modified with an organopolysiloxane, that has the following physicochemical properties:

BET surface area of 200 to 400 $m^2/g$, preferably of 210 to 350 $m^2/g$, mesopore volume for pores having a diameter of 2-30 nm of 0.95 to 1.5 ml/g, preferably of 1.0 to 1.4 ml/g, mesopore volume for pores having a diameter of 2-50 nm of 1.2 to 1.8 ml/g, preferably of 1.3 to 1.7 ml/g, pore maximum in the range from 10 to 50 nm from 15 to 45 nm.

It emerges from this that the surface modification step can be integrated as an additional step into known processes for preparing semi-gels, or else semi-gel precursors can be acquired and can be used as starting material for one of process variants I-III.

As surface-modifying organopolysiloxanes it is preferred in the process of the invention to use the polyorganosiloxanes or modified polyorganosiloxanes that have already been described above.

The surface-modified semi-gels of the invention are used preferably as matting agents in inks and paints.

In addition the surface-modified semi-gels of the invention can be used in all fields of application in which semi-gels are normally used, such as, for example, as a constituent of paper coatings, as a constituent of defoamer formulations, as a reinforcing agent in silicone rubber, or in polymer formulations, as antiblocking agents, for example.

The physicochemical data of the surface-modified semi-gels of the invention are determined by the following methods:

Determination of BET Surface Area

The BET surface area of semi-gels is determined in a method based on DIN ISO 9277 by means of the nitrogen adsorption method of Brunauer, Emmett and Teller (BET). The method is based on the work of S. Brunauer, P. H. Emmett and E. Teller, J. Am. Chem. Soc., 60, 309 (1938).

The measurements are made on the Tristar 3000 instrument (Micromeritics). The samples under analysis are degassed under vacuum ($p<10^{-3}$ mbar) at 160° C. prior to measurement until the pressure over the sample under a closed vacuum remains constant for 30 minutes.

Determination of Mesopore Volume

The mesopore distribution is determined by the method of Barret, Joyner and Halenda (BJH) and is based on work by E. P. Barret, L. G. Joyner and P. H. Halenda, J. Am. Chem. Soc., 73, 373, (1951).

The measurements are made on the ASAP 2400 instrument (Micromeritics). The samples under analysis are degassed under vacuum ($p<10^{-3}$ mbar) at 200° C. prior to measurement until the pressure over the sample under a closed vacuum remains constant for 30 minutes.

Determination of Loss on Drying

The moisture content or loss on drying (LD) of semi-gels is determined in a method based on ISO 787-2 after 2-hour drying at 105° C. This loss on drying is accounted for predominantly by aqueous moisture.

10 g of the pulverulent semi-gel are weighed to an accuracy of 0.1 mg (initial mass E) into a dry glass beaker on a precision balance (Sartorius LC621S). The glass beaker is covered with aluminium foil into which a number of holes (Ø1 mm) have been drilled. The glass beaker covered in this way is dried in a drying oven at 105° C. for 2 h. Thereafter the hot glass beaker is cooled to room temperature in a desiccator over drying agent for at least one hour.

In order to determine the final mass A, the glass beaker is weighed to an accuracy of 0.1 mg on the precision balance. The moisture content (LD) in % is determined in accordance with $$LD = (1 - A/E) * 100,$$

where A=final mass in g and E=initial mass in g.

Determination of Loss on Ignition

According to this method the weight loss of semi-gels is determined in a method based on DIN EN ISO 3262-1 at 1000° C. At this temperature, physically and chemically bound water and other volatile constituents escape. The moisture content (LD) of the sample investigated is determined by the above-described method "Determination of loss on drying" based on DIN EN ISO 787-2.

0.5 g of semi-gel is weighed to an accuracy of 0.1 mg (initial mass E) into a tared porcelain crucible which has been calcined beforehand. The sample is heated in a muffle furnace at 1000±50° C. for 2 h. The porcelain crucible is subsequently cooled to room temperature in a desiccator cabinet with silica gel as drying agent. The final mass A is determined gravimetrically.

The loss on ignition, LOI, in % is obtained in accordance with $$LOI = (1 - A/F) * 100,$$

where F is the corrected initial mass, based on dry matter, in g, and is calculated according to $$F = E * (1 - LD/100).$$

In the calculations, F=final mass in g, E=initial mass in g, and LD=loss on drying, in %.

Determination of DBP Number

The DBP absorption (DBP number), which is a measure of the absorbency of the semi-gel, is determined in a method based on the DIN 53601 standard, as follows:

12.50 g of pulverulent semi-gel (moisture content 4±2%) are introduced into the kneader chamber (article number 279061) of the Brabender absorptometer "E" (without damping of the outlet filter of the torque sensor). With continuous mixing (kneader paddles rotating at a speed of 125 rpm), dibutyl phthalate is added dropwise to the mixture at a rate of 4 ml/min at room temperature by means of the Brabender T 90/50 Dosimat. Its incorporation by mixing takes place with only a small amount of force, and is monitored by means of the digital display. Toward the end of the determination the mixture becomes pasty, which is indicated by a sharp increase in the required force. At a display reading of 600 digits (torque of 0.6 Nm), an electrical contact shuts off both the kneader and the DBP feed. The synchronous motor for the DBP feed is coupled to a digital counter, so that the consumption of DBP in ml can be read off.

The DBP absorption is expressed in g/100 g and is calculated using the following formula:

$$DBP = \frac{V * D * 100}{E} * \frac{g}{100 g} + K$$

where DBP=DBP absorption in g/100 g
V=consumption of DBP in ml
D=density of DBP in g/ml (1.047 g/ml at 20° C.)
E=initial mass of semi-gel in g
K=correction value as per Table 1
(moisture correction table) in g/100 g The DBP absorption is defined for anhydrous, dried semi-gel. When moist semi-gels are used it is necessary to take into account the correction value K for calculating the DBP absorption. This value can be determined using Table 1; for example, a semi-gel having a water content of 5.8% would mean an addition of 33 g/100 g for the DBP absorption. The moisture content of the semi-gel is determined in accordance with the "Determination of loss on drying" method described.

TABLE 1

Moisture correction table for dibutyl phthalate absorption - anhydrous -

| | % Water | | | | |
|---|---|---|---|---|---|
| % Water | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of Particle Size

The application of laser diffraction for determining particle size distributions of solids in powder form is based on the phenomenon whereby particles, as a function of their size, scatter—or diffract—the light of a monochromatic laser beam with different intensity patterns in all directions. The smaller the diameter of the irradiated particle, the larger the scattering or diffraction angles of the monochromatic laser beam.

Sample preparation and measurement take place, in the case of hydrophilic silicon dioxides, with deionized water as the liquid for dispersing, or, in the case of silicon dioxides that cannot be adequately wetted with water, with pure ethanol. Prior to measurement being commenced, the laser diffraction instrument LS 230 (Beckman Coulter; measuring range: 0.04-2000 μm) and the liquid module (Small Volume Module Plus, 120 ml, Beckman Coulter) are run for 2 hours to warm up, and the module is rinsed three times with deionized water.

For the measurement of hydrophobic precipitated silicas, the rinsing operation is carried out with pure ethanol.

In the instrumental software of the LS 230 laser diffraction instrument, the following optical parameters, relevant for evaluation in accordance with the Mie theory, are defined in an .rfd file:

refractive index of the dispersing liquid B. I. $\text{Real}_{water}=$ 1.332 (1.359 for ethanol); refractive index of the solid (sample material) $\text{Real}_{SiO2}=1.46$ imaginary=0.1 form factor=1

In addition, the following parameters relevant to particle measurement must be set:

measuring time=60 s number of measurements=1 pump speed=75%

Depending on the nature of the sample, it may be introduced directly in the form of the powder solid, using a spatula, or in suspended form, using a 2 ml single-use pipette, into the liquid module (Small Volume Module Plus) of the instrument. When the sample concentration needed for measurement has been reached (optimum optical shading), the instrumental software of the LS 230 laser diffraction instrument reports "OK". Ground silicon dioxides are dispersed in the liquid module by 60 s of ultrasonication using a Vibra Cell VCX 130 ultrasound processer from Sonics, with CV 181 ultrasound converter and 6 mm ultrasound tip, at 70% amplitude, with simultaneous pumped circulation. In the case of unground silicon dioxides, dispersing takes place without ultrasonication, by pumped circulation for 60 s in the liquid module. Measurement is carried out at room temperature. From the raw data, the instrumental software uses the previously defined optical parameters (.rfd file) to make a calculation, on the basis of the Mie theory, of the volume distribution of the particle sizes and the $d_{50}$ value (median value).

ISO 13320 "Particle Size Analysis—Guide to Laser Diffraction Methods" describes in detail the method of laser diffraction for determining particle size distributions.

Determination of Carbon Content

The carbon content of semi-gels is determined using the C-mat 500 (Ströhlein Instruments). The samples are heat treated at about 1350° C. and the carbon is oxidized to $CO_2$ by a stream of oxygen. The $CO_2$ is measured in an infrared cell.

In the course of the measurements a distinction is made as to whether the carbon content is greater than or less than 1 per cent. If the carbon content of the homogeneous samples is above 1 per cent, measurement is carried out in the "High" range of the instrument; if it is below 1 per cent, measurement is carried out in the "Low" range.

First of all the control sample is measured. For that purpose, 0.14-0.18 g of the control sample is weighed out on an analytical balance into a porcelain boat purified by calcining and cooled to room temperature. When the start button is operated the weight is carried over, since the balance is coupled with the C-mat. The boat must be pushed into the middle of the combustion tube within 30 seconds. When combustion is at an end the measurement is converted into pulses and evaluated by the computer. At least 3 determinations (depending on agreement) are carried out. It may be necessary to readjust the factor of the instrument (for details see operating instructions for C-mat 500, Ströhlein Instruments). This factor is calculated according to the following formula:

$$\text{factor} = \frac{\text{setpoint(standard)} * \text{initial mass (standard) in } g * 10^8}{\text{pulses}}$$

Subsequently the semi-gel samples are measured. The initial mass is 0.04-0.05 g. The porcelain boat is covered with a porcelain lid. In the event of deviations >0.005% a greater number of measurements are carried out and the average is calculated.

The operation of the C-mat 500 is taken from the operating instructions from the company Ströhlein Instruments.

The carbon content is calculated as follows and expressed in the unit %:

$$\text{carbon content} = (P*F*10^{-8})/E$$

p=pulse

F=factor

E=initial mass in g

Determination of Coat Thickness

The reflectometer value of matted coating materials is influenced by, among other factors, the coat thickness of the coating. It is therefore necessary to monitor the thickness of the dried coating film precisely.

The following procedure applies only to the measurement of single-coat films on glass substrates. Prior to the implementation of the measurement, the probe of the ultrasonic coat-thickness measuring instrument (QuintSonic, Elektro Physik) must be calibrated in accordance with the instrument operating instructions. After sufficient coupling agent has been applied to the probe measurement area, the probe is placed perpendicularly onto the surface of the coating and the measurement is started by pressing the probe button. After a short time the measured value is displayed. The probe is lifted from the measurement area.

At least 5 measurements are carried out at measurement sites distributed uniformly on the object to be measured. It should be ensured that the measurement sites do not exhibit any defects, such as craters, inclusions, scratches, air bubbles, etc., or any soiling.

From the measurement data obtained an average shall be formed and rounded to an accuracy of 1 μm.

Determination of 60° and 85° Reflectometer Value

The effect exerted on reflectance as a result of deliberate roughening of coating film surfaces is the outstanding property of matting agents based on $SiO_2$. The reflectometer value is therefore an important criterion for characterizing matted coating films.

A prerequisite for the measurement is that the coating film surfaces to be measured should be planar, clean and cured.

The measurement is to be carried out on at least 3 representative sites on the sample by means of a reflectometer with measuring geometry according to DIN 67530 (e.g. Haze-gloss, BYK Instruments). If the individual measurements deviate from one another too greatly, then generally a further measurement should be carried out at representative sites, or the number of individual measurements should be increased to >3. On the BYK haze-gloss the display shows the standard deviation of the measurements. If the standard deviation s is >0.5 it is advisable to carry out the abovementioned measures. The average value shall be reported to 1 decimal place.

In the characterization of matted coating film surfaces it has been found appropriate to carry out measurement with the 60° and the 85° measuring geometries. In deviation from DIN 67530, therefore, the reflectometer values of matted coating film surfaces are determined using both measuring geometries.

EXAMPLES

The examples which follow are intended to illustrate the invention without restricting its scope.

Inventive Example 1

Semi-Gel SD 500 from Beijing Aerospace Sai De Power Material Technical Company Ltd., Yuquan Road No. 16, Haidian District, Beijing (China), with the physicochemical data as per Table 2 below, is ground using an Alpine AFG 50 jet mill, as below, and at the same time is coated with a suspension consisting of 50% by weight of the organopolysiloxane TegoRad 2300 and 50% by weight of ethanol:

classifier speed: 15 000 rpm
classifying air: 30 m$^3$/h (stp)
grinding pressure: 4 bar
PID fan: 51%
total air: 82 m$^3$/h (stp)
throughput: 0.57 kg$_{SiO2}$/h
grinding time: 80 min The product is subsequently dried in a drying cabinet at 80° C. for 2.5 h.

The TegoRad 2300 suspension is added so as to result eventually in a surface-modified semi-gel having the physicochemical properties reported in Table 2.

Inventive Example 2

Semi-Gel SD 600 from Beijing Aerospace Sai De Power Material Technical Company Ltd., Yuquan Road No. 16, Haidian District, Beijing (China), with the physicochemical data as per Table 2 below, is ground using an Alpine AFG 50 jet mill, as below, and at the same time is coated with a suspension consisting of 50% by weight of the organopolysiloxane TegoRad 2300 and 50% by weight of ethanol:

classifier speed: 15 000 rpm
classifying air: 30 m$^3$/h (stp)
grinding pressure: 4 bar
PID fan: 51%
total air: 79 m$^3$/h (stp)
throughput: 0.75 kg$_{SiO2}$/h
grinding time: 80 min The product is subsequently dried in a drying cabinet at 80° C. for 2.5 h.

The TegoRad 2300 suspension is added so as to result eventually in a surface-modified semi-gel having the physicochemical properties reported in Table 2.

TABLE 2

Physicochemical properties of the reactants and products of Inventive Examples 1 and 2

| Parameter | Unit | Inv. Ex. 1 starting material | Inv. Ex. 1 after coating | Inv. Ex. 2 starting material | Inv. Ex. 2 after coating |
|---|---|---|---|---|---|
| BET surface area (multipoint) | m$^2$/g | 264 | 243 | 286 | 206 |
| DBP (anhydrous) | g/(100 g) | ND | 242 | ND | 255 |
| C content | % by wt. | ND | 2 | ND | 1.8 |
| Moisture content | % by wt. | ND | 2.1 | ND | 2.5 |
| Total pore volume | m$^3$/g | 1.642 | 1.585 | 1.708 | 1.409 |
| Mesopore volume for diameters 2-50 nm | m$^3$/g | 1.477 | 1.447 | 1.401 | 1.105 |
| Mesopore volume for diameters 2-30 nm | m$^3$/g | 1.236 | 1.203 | 1.116 | 0.713 |
| Maximum of the volume pore size distribution function | nm | 24.8 | 26.1 | 23.9 | 27.4 |
| Particle diameter d10 | μm | 13.73 | 4.35 | 17.58 | 3.43 |
| Particle diameter d50 | μm | 83.79 | 7.21 | 113.6 | 5.87 |
| Particle diameter d90 | μm | 193.6 | 10.58 | 234.8 | 9.58 |
| Span | | 2.15 | 0.86 | 1.91 | 1.047 |

ND = Not determined

Comparative Example 1

For Comparative Example 1, the precipitated silica ACE-MATT® HK 400 from Evonik Degussa GmbH was coated with 8 percent by mass of TegoRad® 2300.

Example 4

Testing of the Coatings Properties of the Semi-Gels of the Invention in a Black Coating Material The black coating material used was Duplex D 1326 from DuPont, manufactured by Herberts Austria GmbH. 5.5 g of each of the matting agents were incorporated.

The 60° and 85° reflectometer values are determined in a method based on DIN 67530, ISO 2813 or TM 523-78, and the sheen (i.e., 85° reflectometer value-60° reflectometer value) is calculated (see Table 3). Knowing the sheen allows a statement to be made concerning the matting effect on a surface at different angles of observation. A lower sheen means that a surface appears matt from every angle at which it is viewed.

TABLE 3

| | Black coating material | | | | |
|---|---|---|---|---|---|
| SiO$_2$ from example | Initial mass [g] | Coat thickness [μm] | 60° reflectometer value [%] | 85° reflectometer value [%] | Sheen [%] |
| 1 | 5.5 | 26-30 | 21.6 | 64.1 | 29.3 |
| 2 | 5.5 | 26-30 | 23.4 | 74.4 | 29.7 |
| C 2 | 5.5 | 26-30 | 21.1 | 80.5 | 59.4 |

The data in Table 3 shows that the matting efficiency of the surface-modified semi-gels of the invention is significantly improved in comparison with that of a precipitated silica treated with the same surface modifier and sold as a matting agent, the improvement applying particularly in respect of the gloss value at 85°. The coatings matted with the matting agents of the invention appear uniformly matt from all viewing angles, as confirmed by the sheen, which is improved by approximately 50%.

The invention claimed is:

1. A surface-modified semi-gel, comprising:
a silicon dioxide semi-gel having a surface modified with 0.2% to 12% by weight relative to the silicon dioxide semi-gel of at least one of a silicone polyether acrylate polymer and a silicone polyether methacrylate polymer;
wherein
the semi-gel is in the form of a particulate structure;
a mesopore volume for pores having a diameter of 2-30 nm of the surface-modified silicon dioxide semi-gel is 0.7 to 1.5 ml/g; and
a mesopore volume for pores having a diameter of 2-50 nm of the surface-modified silicon dioxide semi-gel is 0.9 to 1.8 ml/g.

2. The surface-modified semi-gel of claim 1, wherein:
a BET surface area of the surface-modified silicon dioxide semi-gel is 200 to 400 $m^2/g$; and
a pore maximum of the surface-modified silicon dioxide semi-gel is from 10 to 50 nm.

3. An article, comprising the surface-modified semi-gel of claim 1, wherein the article is at least one selected from the group consisting of a matting agent in a paint, a matting agent in a coating, a constituent of a paper coating, a defoamer formulation, a reinforcing agent in silicone rubber, a reinforcing agent in a plastic, and an antiblocking agent.

4. A coating formulation, comprising the surface-modified semi-gel of claim 1.

5. The surface-modified semi-gel of claim 1, wherein the at least one of a silicone polyether acrylate polymer and a silicone polyether methacrylate polymer is obtained by esterification or transesterification of acrylic acid, methacrylic acid, an acrylic ester, a methacrylic ester, or a mixture thereof, in the presence of an enzyme which catalyses the esterification or transesterification with at least one hydroxy-functional and/or polyoxyalkylene-modified siloxane derivative of formula (III):

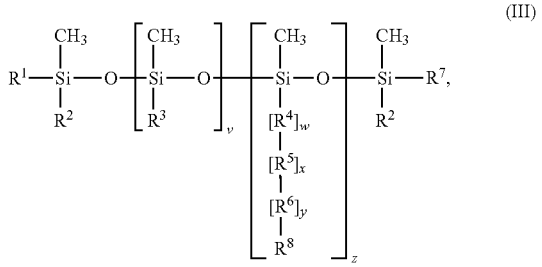

wherein:
$R^1$, $R^7$, or both $R^1$ and $R^7$, represent $R^2$ or $[R^4]_w$—$[R^5]_x$—$[R^6]_y$—$R^8$;
$R^2$ and $R^3$ individually represent identical or different alkyl radicals, alkylene radicals having 1 to 24 carbon atoms, or substituted phenyl radicals having up to 24 carbon atoms;

$R^4$ represents a divalent radical of the formula O, NH, $NR^2$, S or a radical of the formula $(OSi(CH_3)_2)_u$;
u=1 to 200;
$R^5$ represents identical or different alkyl radicals or alkylene radicals having 1 to 24 carbon atoms, or $C_nH_{2n-f}R^2_f$—$R^4$—$C_mH_{2m-g}R^2_g$;
f=0 to 12;
g=0 to 12;
n=1 to 18;
m=1 to 18;
$R^6$=O—$(C_2H_{4-a}R^2_a O)_b(C_cH_{2c}O)_d$;
a=0 to 3;
b=0 to 100;
c=2 to 12;
d=0 to 100;
a sum of (b+d)=1 to 200;
a sequence of individual polyoxyalkylene segments $(C_2H_{4-a}R^2_a O)_b$ and $(C_cH_{2c}O)_d$ optionally comprises a block copolymer;
$R^6$=$O_e$—$C_hH_{2h}$—$C_iH_{2i-j}R^9_j$;
e=0 or 1;
h=0 to 24;
i=0 to 24;
j=1 to 3;
a sum of (w+e)=0 to 1;
$R^9$ represents a divalent radical of the formula O, a hydroxyl group, a radical of the formula $C_hH_{2h}$, or a radical of formula $C_kH_{2k-l}(OH)_l$;
k=0 to 24;
l=1 to 3;
$R^8$=a hydrogen radical or a monovalent organic radical;
when y is 1, at least one hydrogen radical, OH group, or monovalent organic radical is present per molecule;
when y=0, at least one OH group is present per molecule;
v=0 to 200;
w=0 or 1;
x=0 or 1;
y=0 or 1;
z=0 to 200;
a sum of (w+x+y)=1 to 3;
when z=0,
$R^1$, $R^7$, or both $R^1$ and $R^7$, are $[R^4]_w$—$[R^5]_x$—$[R^6]_y$—$R^8$; and
when x=0, then w=0.

6. The surface-modified semi-gel of claim 1, wherein a BET surface area of the surface-modified semi-gel is 200 to 350 $m^2/g$.

7. The surface-modified semi-gel of claim 1, wherein a mesopore volume for pores having a diameter of 2-30 nm of the surface-modified semi-gel is 0.95 to 1.4 ml/g.

8. The surface-modified semi-gel of claim 1, wherein a mesopore volume for pores having a diameter of 2-50 nm of the surface-modified semi-gel is 1.0 to 1.7 ml/g.

9. The surface-modified semi-gel of claim 1, wherein a pore maximum of the surface-modified semi-gel is 15 to 45 nm.

10. A process for preparing the surface-modified semi-gel of claim 1, the process comprising contacting the surface of the semi-gel with the at least one of a silicone polyether acrylate polymer and a silicone polyether methacrylate polymer.

11. The process of claim 10, wherein:
surface modification occurs during at least one time selected from the group consisting of before, after, and simultaneously with a grinding operation; and
the grinding operation employs an air-jet mill, steam jet mill, or opposed-jet fluidized-ed mill.

12. The process of claim 10, wherein the at least one of a silicone polyether acrylate polymer and a silicone polyether methacrylate polymer is added in pure, undiluted form or in dilute form as an aqueous emulsion.

13. The process of claim 10, wherein:
- a BET surface area of the surface-modified semi-gel is 200 to 400 m$^2$/g;
- a mesopore volume for pores having a diameter of 2-30 nm of the surface-modified semi-gel is 0.95 to 1.5 ml/g;
- a mesopore volume for pores having a diameter of 2-50 nm of the surface-modified semi-gel is 1.2 to 1.8 ml/g; and
- a pore maximum of the surface-modified semi-gel is in the range from 10 to 50 nm.

14. The process of claim 10, further comprising drying the surface-modified semi-gel.

\* \* \* \* \*